United States Patent [19]
Schmid et al.

[11] Patent Number: 5,641,131
[45] Date of Patent: Jun. 24, 1997

[54] COMBINED SEAT BELT RETRACTOR AND TENSIONER UNIT

[75] Inventors: Johannes Schmid, Schwäbisch Gmünd; Thomas Mödinger, Alfdorf, both of Germany

[73] Assignee: TRW Repa GmbH, Alfdorf, Germany

[21] Appl. No.: 327,009

[22] Filed: Oct. 21, 1994

[30] Foreign Application Priority Data

Oct. 25, 1993 [DE] Germany .................... 43 36 367.9
Apr. 29, 1994 [DE] Germany .................... 44 15 103.9

[51] Int. Cl.$^6$ .................................................. B60R 22/46
[52] U.S. Cl. ......................................................... 242/374
[58] Field of Search .................. 242/374; 280/806, 280/805; 297/476–480

[56] References Cited

U.S. PATENT DOCUMENTS

| | | | |
|---|---|---|---|
| 3,220,668 | 11/1965 | Martin | 242/374 |
| 3,386,683 | 6/1968 | Howland | 242/374 |
| 4,434,953 | 3/1984 | Gemar et al. | 242/374 |
| 4,508,287 | 4/1985 | Nilsson | 242/374 |
| 5,443,222 | 8/1995 | Modinger et al. | 242/374 |

FOREIGN PATENT DOCUMENTS

| | | | |
|---|---|---|---|
| 0059643 | 9/1982 | European Pat. Off. . | |
| 0582096 | 2/1994 | European Pat. Off. . | |
| 3140270 | 4/1983 | Germany | 242/374 |
| 3220498 | 12/1983 | Germany | 242/374 |
| 9308273.8 | 7/1993 | Germany . | |
| 0419852 | 3/1967 | Switzerland . | |

*Primary Examiner*—John M. Jillions
*Attorney, Agent, or Firm*—Tarolli, Sundheim, Covell, Tummino & Szabo

[57] ABSTRACT

In a belt tensioner for vehicular seat belt restraining systems the belt reel (16) of a belt retractor is caused to rotate by a linear drive unit via a step-up gear. The linear drive unit comprises a burstproof cylinder tube (42) closed off at both ends and a hollow piston (44) shiftable therein. Within said hollow piston a pyrotechnical propelling charge (50) with an igniter (52) is accommodated. The belt tensioner is distinguished by its compact configuration, low weight and low-cost production as well as by the linear drive unit being safe to handle.

11 Claims, 9 Drawing Sheets

COMBINED SEAT BELT RETRACTOR AND TENSIONER UNIT

The invention relates to a combined seat belt retractor and belt tensioner unit for vehicular seat belt restraining systems.

In seat belt retractor and belt tensioner unit known from U.S. Pat. No. 3,386,683, a piston/cylinder linear drive unit is provided with a pyrotechnical propellant charge and a piston for driving a tooth rack. The tooth rack in turn drives the belt reel of the retractor through a step-up gear. The linear drive unit of this belt tensioner consists of a cylinder tube joined to a gear housing and a piston guided therein, to the bottom of which a tooth rack is connected. To activate the belt tensioner a propelling charge is ignited which then subjects the piston to the impact of a gas under high pressure so that the tooth rack is shifted in the cylinder tube, causing the pinion meshing with the tooth rack to rotate. The output of the step-up gear is directly coupled to the belt reel of the belt retractor. To avoid increasing the space requirement of such a belt tensioner due to the length of the cylinder tube still further, the gas generator is arranged at right-angles to the axis of the cylinder tube. However, even for such an angled configuration it is still difficult to find the installation space necessary therefor in a vehicle.

As regards belt tensioners having a pyrotechnical drive there exists a problem in general with respect to safe handling, storage and transportation of the gas generator, which as a rule, is the last component to be installed in the belt tensioner. To satisfy existing safety regulations, complicated precautionary measures are necessary in storage, transportation and installation of the gas generators.

According to the present invention, a combined seat belt retractor and belt tensioner unit is provided which comprises a linear drive unit and a gear, and which has a compact configuration, permits easy manufacture and installation, has low weight and low production costs. In accordance with the invention the piston is configured hollow, it accommodating in its hollow space the pyrotechnical propelling charge. In addition, the tooth rack is formed along the envelope of the piston itself. Due to the hollow configuration of the piston the constructional space for accommodating a separate gas generator is completely saved. Also eliminated, however, are losses due to gas deflection, since the gases liberated by the propelling charge act directly on the piston in axial direction. For a given tensioner performance the quantity of the pyrotechnical propelling charge can thus be reduced. In conclusion, by locating the tooth rack on the envelope of the piston itself savings in the axial construction length of the linear drive are gained, so that all-in-all a highly compact configuration is achieved which for the first time opens up the possibility of employing belt tensioners also on the rear seats of a vehicle.

The piston may be inserted in a cylindrical bore of a gear housing joined to to the side of the belt retractor. In such an embodiment there is no need for a separate cylinder tube.

One particularly advantageous embodiment results, however, from the piston being accommodated in a cylinder tube which is inserted in a bore of a gear housing applied to the side of the belt retractor and has its envelope provided with a cutout for the penetration of the pinion. The cylinder tube forms together with piston, propelling charge and a suitable igniter a preassembled unit which as such may be furnished by manufacturers specialized in the production of pyrotechnical gas generators. When, in addition, the cylinder tube is provided at one axial end with a burstproof stop for the piston and at its other end with a burstproof bottom, a linear drive unit results which involves no special measures to be handled safely. By simulating an ignition by misuse it has been demonstrated that such a linear drive unit liberates no substantial forces outwardly and remains practically at rest, since within the cylinder tube opposite forces and moments are generated, which compensate more or less each other.

A further advantage in the application of such a self-contained and intrinsically safe linear drive unit is that there is no need for special requirements to be made on the gear housing. The latter merely requires being provided with a suitably dimensioned bore in which the cylinder tube is inserted. In particular the gear housing may be made of synthetic material so that savings in weight and production costs are achieved. One particularly favorable configuration results from combining the gear housing with a spring housing.

Further features and advantages of the invention will be apparent from the description and drawing to which reference is made and in which.

Figure 1:
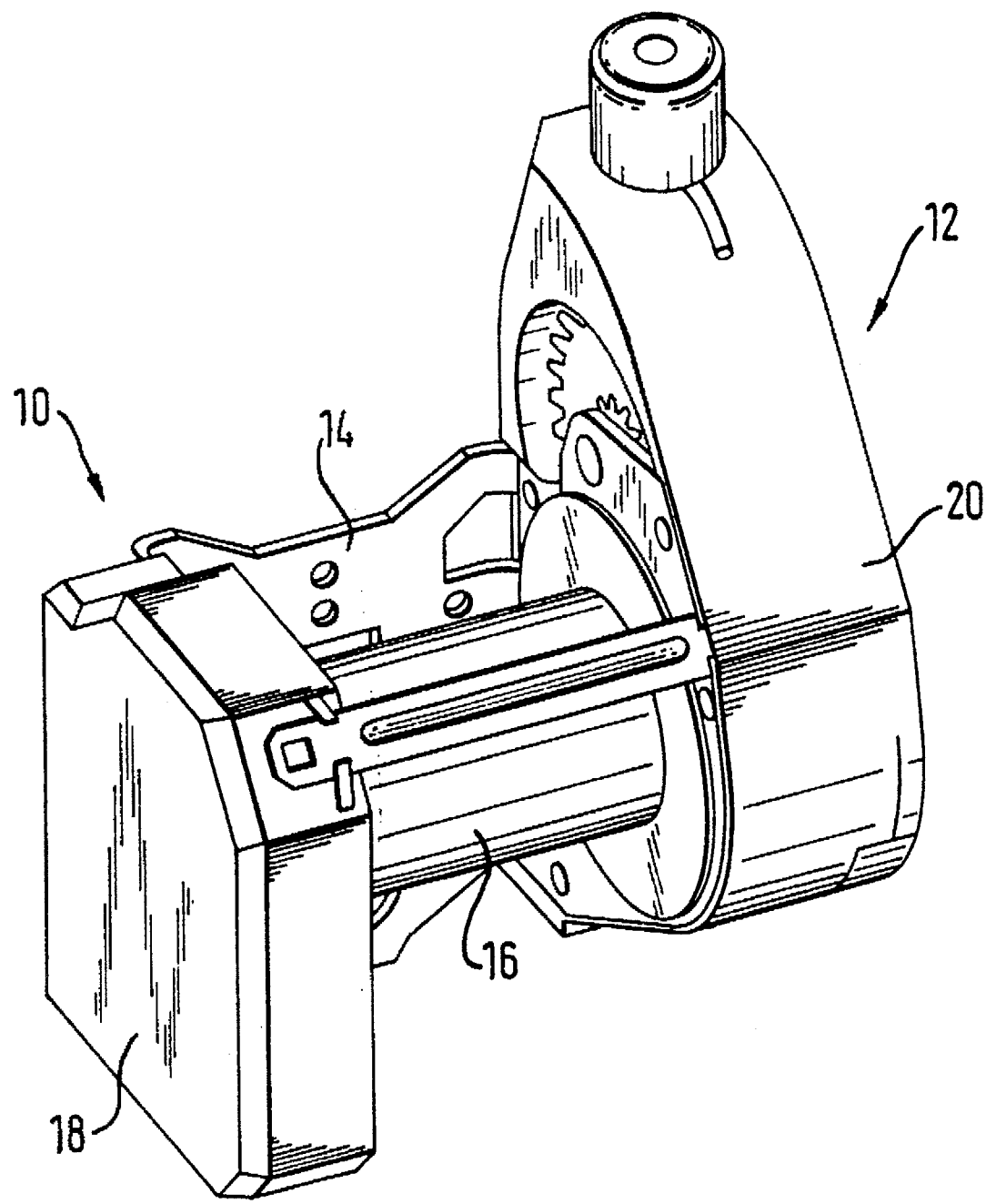
FIG. 1 is a perspective view of a belt retractor having a side attached belt tensioner.
Figure 2:
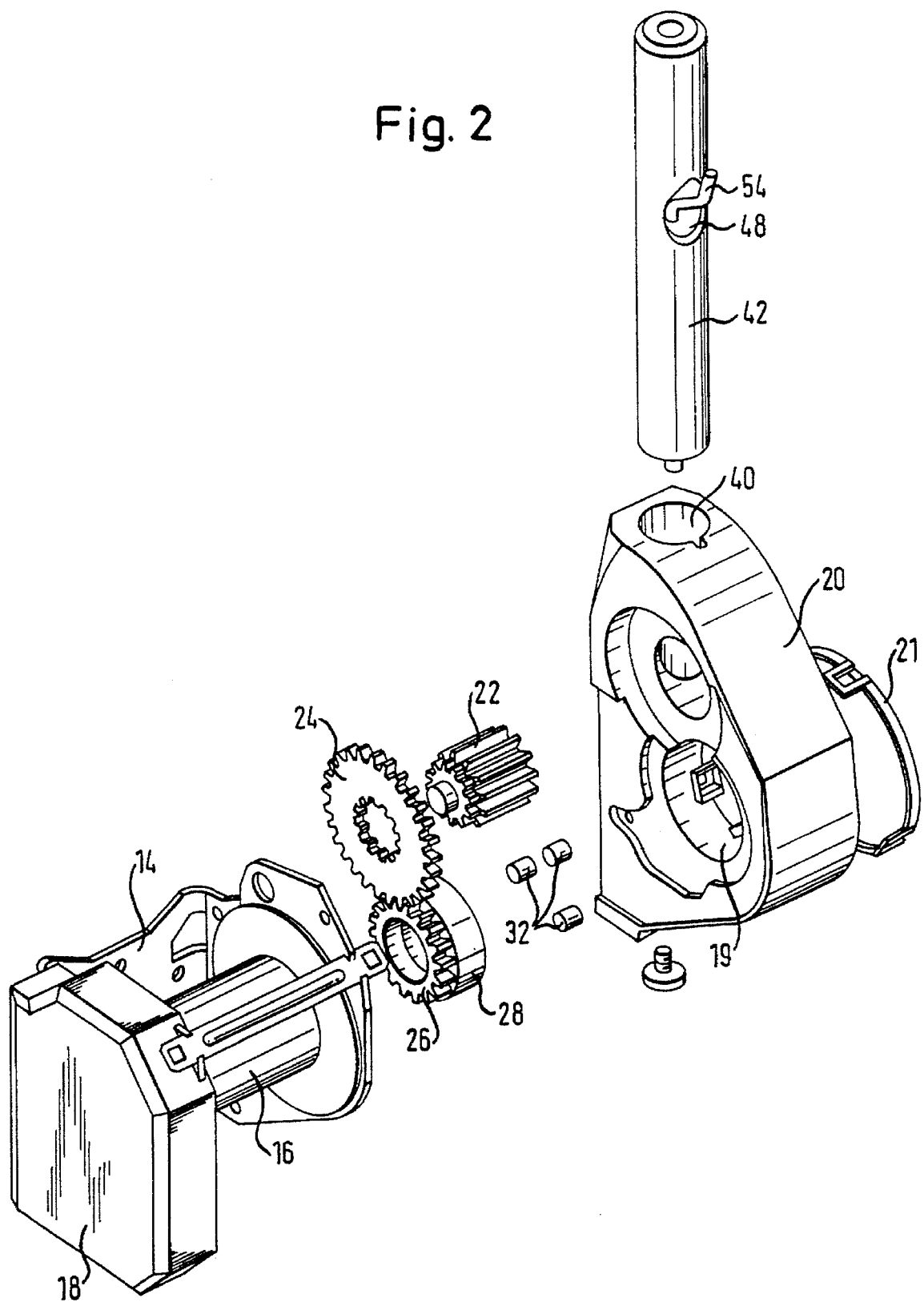
FIG. 2 is an exploded view of the assembly shown in FIG. 1.

In the preferred embodiment shown in FIG. 1 a belt retractor identified in general by 10 is combined with a belt tensioner identified in general by 12 to form a unit. The belt retractor 10 comprises a load-carrying frame 14 in which a belt reel 16 is rotatably mounted, and a vehicle and webbing-sensitive locking mechanism 18 which is arranged on the side of the frame 14 opposing the belt tensioner 12. In the housing 20 of the belt tensioner an accommodating space 19 for the winding spring of the belt tensioner is contained which is closed off by a cover 21.

The housing 20 consisting preferably of a synthetic material accommodates a gear and a coupling as well as a pyrotechnical linear drive unit. The gear comprises an input pinion 22, a first gearwheel 24 coupled for joint rotation with said pinion 22 as well as a second gearwheel 26 meshing with said gearwheel 24. The second gearwheel 26 is formed integral with a coupling ring 28 which surrounds a lateral drive projection 30 from the side of the belt reel 16 with radial spacing. The interior surface of the coupling ring 28 facing the drive projection 30 is provided with ramped flats supporting three clamping rolls 32.

Figure 3A:
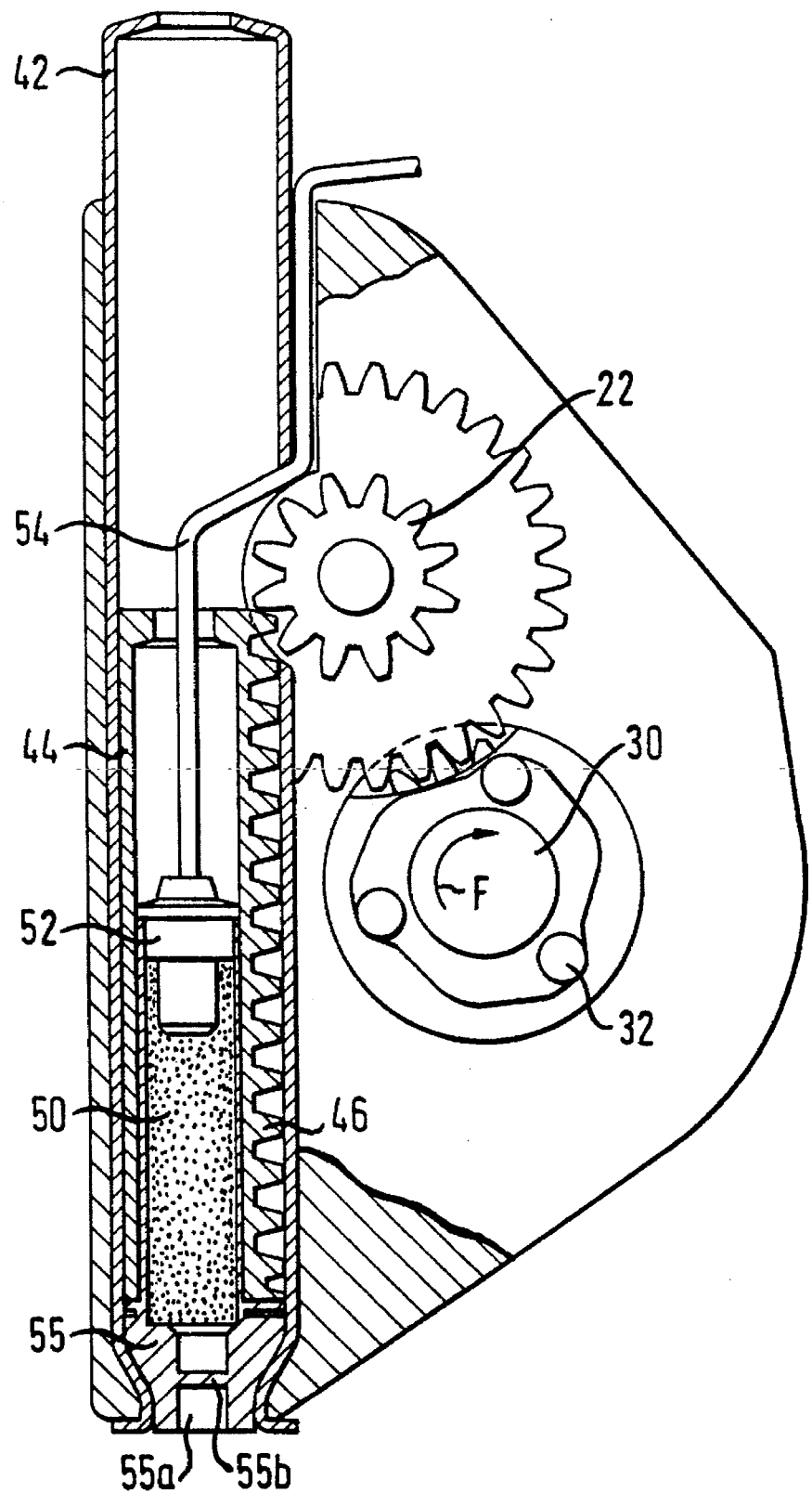
FIGS. 3a and 3b show a schematic longitudinal section to explain the way in which the belt tensioner works in the rest condition and after activation of the gas generator.
Figure 3B:
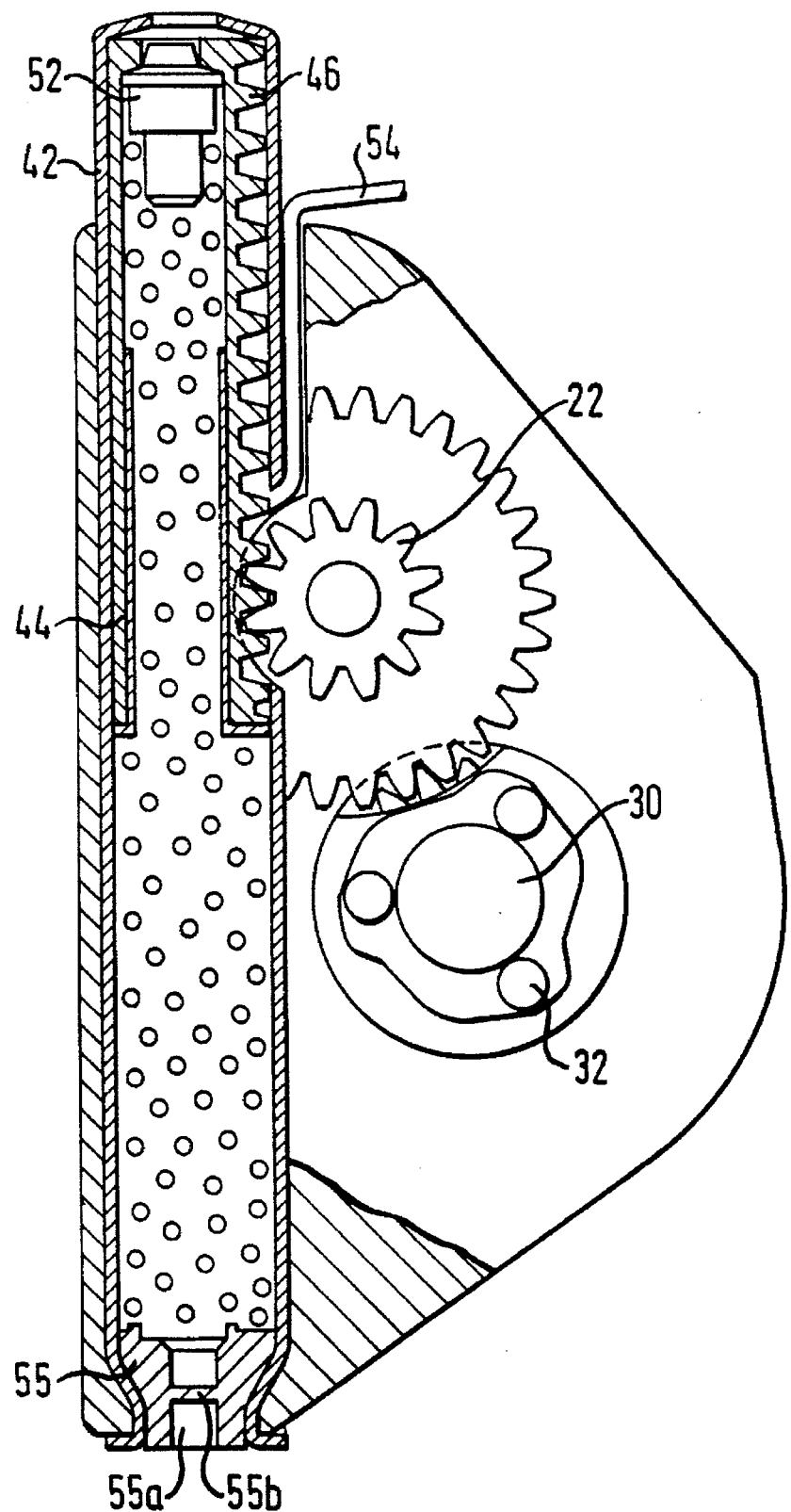

The pinion 22 forms together with the gearwheels 24 and 26 a step-up gear. Due to the clamping rolls 32 clockwise rotation of the coupling ring 28 as indicated by the arrow F in FIG. 3a produces a drive connection between the gearwheel 26 and the drive projection 30 of the belt reel 16.

In a cylindrical bore 40 of the housing 20 a cylinder tube 42 is inserted, the free end of which slightly protrudes from the bore 40. Inside the cylinder tube 42 a hollow piston is accommodated. On the side facing the pinion 22 the envelope of the piston 44 has the form of a tooth rack having a toothing 46. The pinion 22 protrudes through a cutout 48 in the wall of the cylinder tube 42 into the interior of the latter and commencingly meshes with the toothing 46. The axial length of the piston 44 is smaller than that of the cylinder tube 42 so that the piston is shiftable inside the cylinder tube 42.

In the interior of the hollow piston 44 a pyrotechnical propelling charge 50 is accommodated. Within the piston an electric igniter 52 is accommodated additionally, which is activatable by an electric lead 54 brought out through the cutout 48.

The bottom of the cylinder tube 42 is conically tapered and provided with a plug 55. The plug 55 has an axial passage 55a formed therein, which is closed by a diaphragm 55b susceptible of being ruptured under excessive pressure. The diaphragm 55b is dimensioned to resist normal operating pressure of the propelling charge 50, but to be ruptured upon excessive pressure such as occurring by misuse or by burning of the vehicle, in order to safely avoid explosion of the housing 20.

On activation of the igniter 52 the pyrotechnical propelling charge 50 is ignited. Due to the gases then being generated and being at high pressure the piston 44 in the cylinder tube 42 is shifted ahead, the linear movement of the piston 44 being converted into a rotary movement of the pinion 22 by the meshing action between the toothing 46 and the pinion 22. Via the gear and the clamping coupling roll the belt reel is caused to rotate, to retract the belt webbing and thus pull the belt slack from the belt system.

Figure 4A:
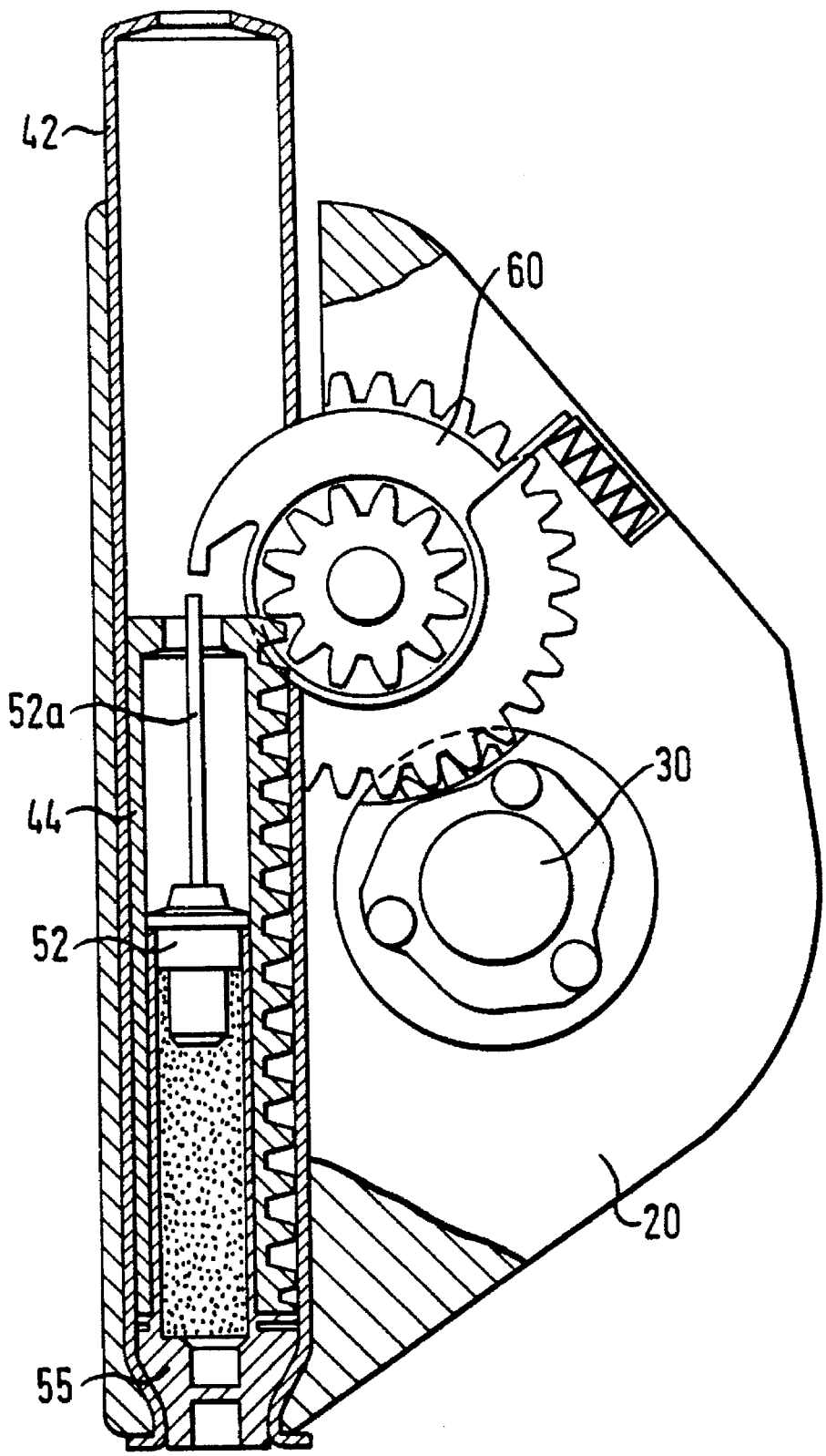
FIGS. 4a and 4b are corresponding views of a belt tensioner according to another embodiment.
Figure 4B:
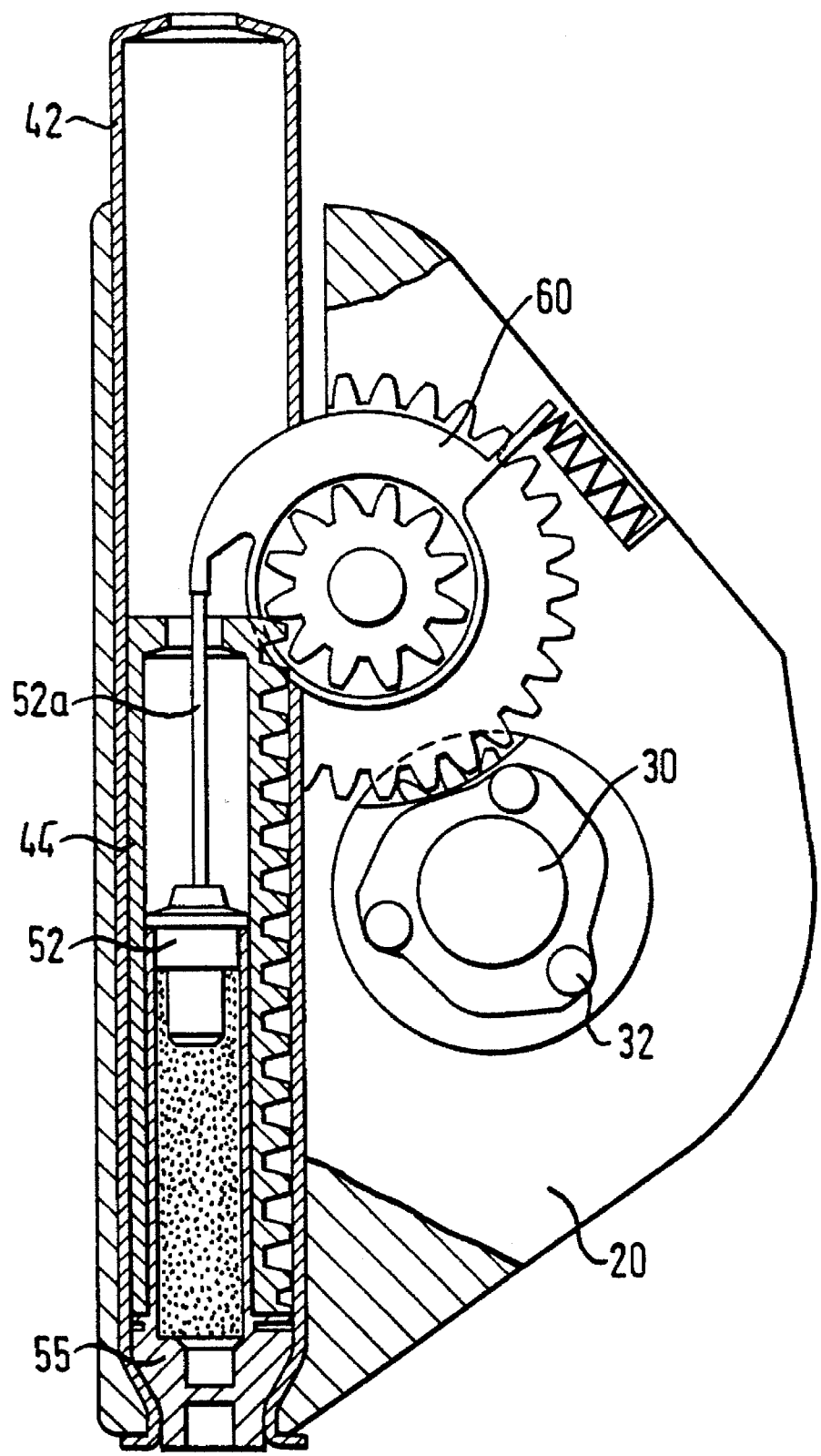

In the embodiment variants shown in FIGS. 4a and 4b the ignition is not made electrically but mechanically, since the igniter 52 is formed as an impact igniter made with an impact pin 52a protruding through the open end of the piston 44. A spring-loaded, swivably mounted impact-pad 60 is released by a vehicle-sensitive sensor (not shown) and by heavy vehicle deceleration and hits the impact pin 52a so that the igniter 52 is activated. Due to the subsequent piston movement the impact-pad 60 is swivelled-back.

Figure 5:
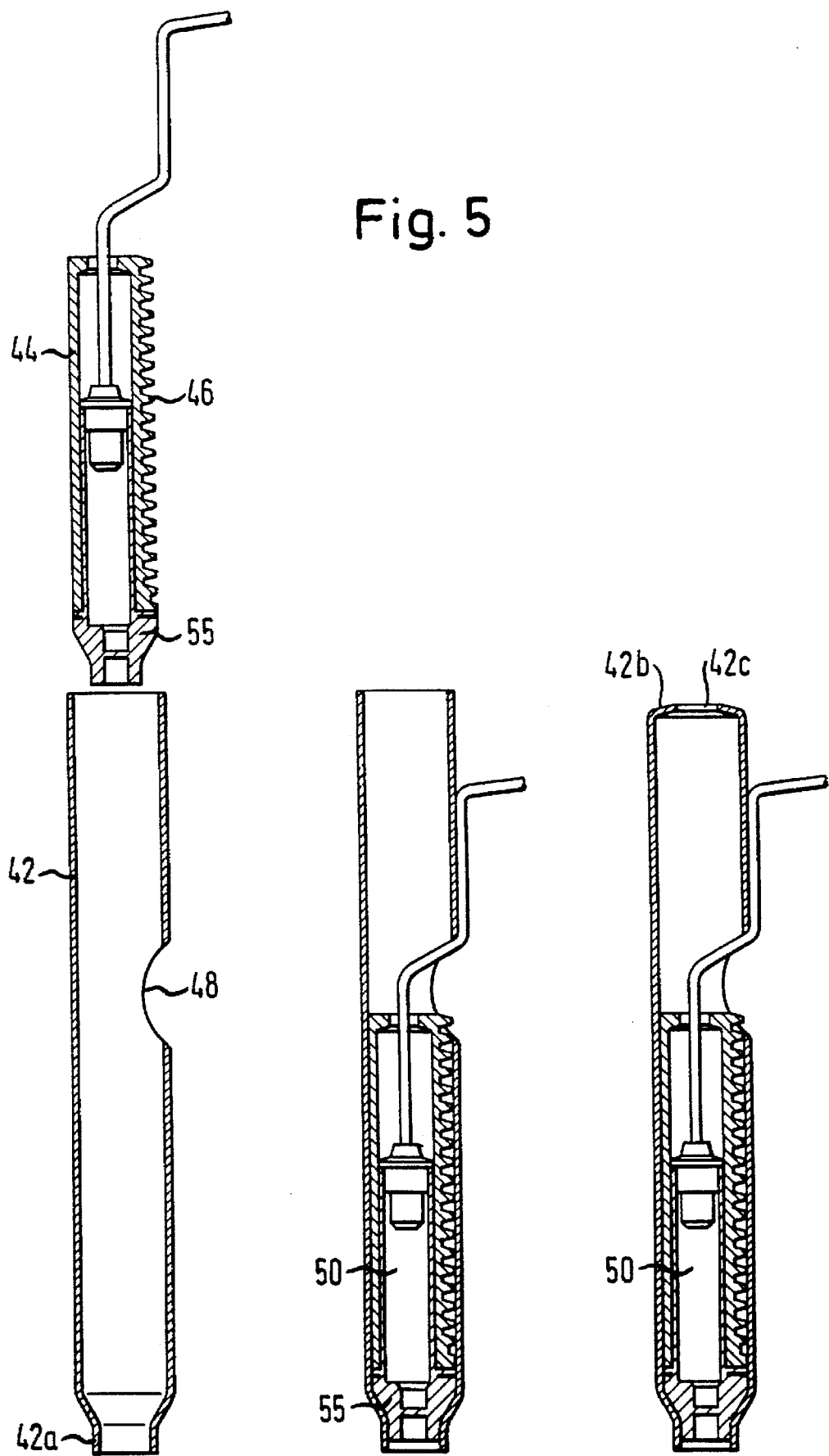
FIG. 5 shows schematically the production of a pyrotechnical linear drive unit.

The cylinder tube 42 is preferably produced from sheet steel, stamped and rolled and welded at the butt joint. One of the two axial ends of the cylinder tube is deformed radially inwardly, the thus tapered end 42a forming a seat for plug 55. As illustrated in FIG. 5 the other end 42b of the cylinder tube 42 is partly closed off by rim-flanging after having inserted the piston 44 already provided with the propelling charge 50. Air displaced by the piston 44 is able to escape through the remaining opening 42c. As is further evident from FIGS. 3a to 4b the attaching of the cylinder tube 42 to the housing 20 may be realized by inserting the tapered end 42a through a base opening of the housing 20 and by rim-flanging the protruding end.

Figure 6A:
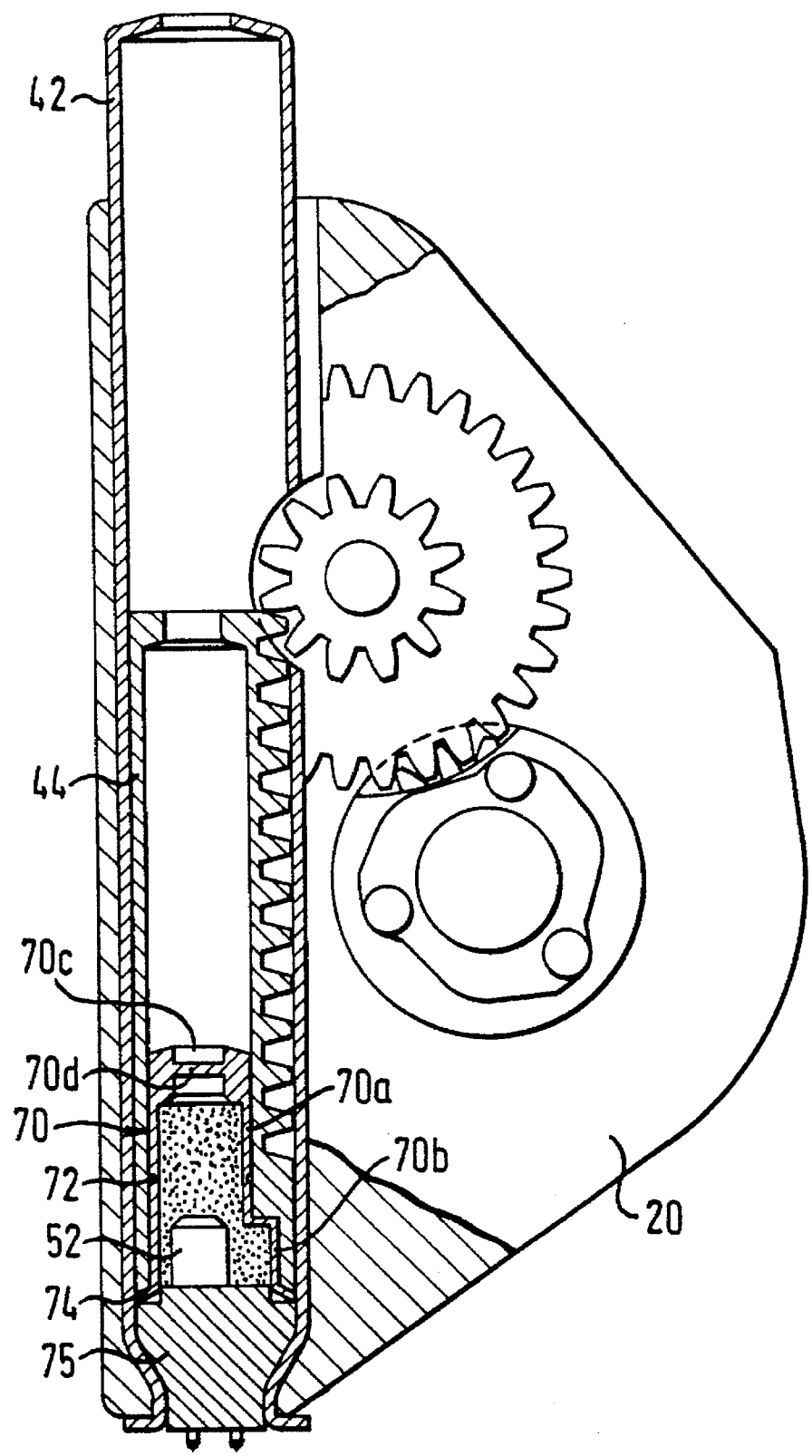
FIGS. 6a and 6b are schematic section views of a further embodiment of the belt tensioner in the rest condition and after activation of the gas generator.
Figure 6B:
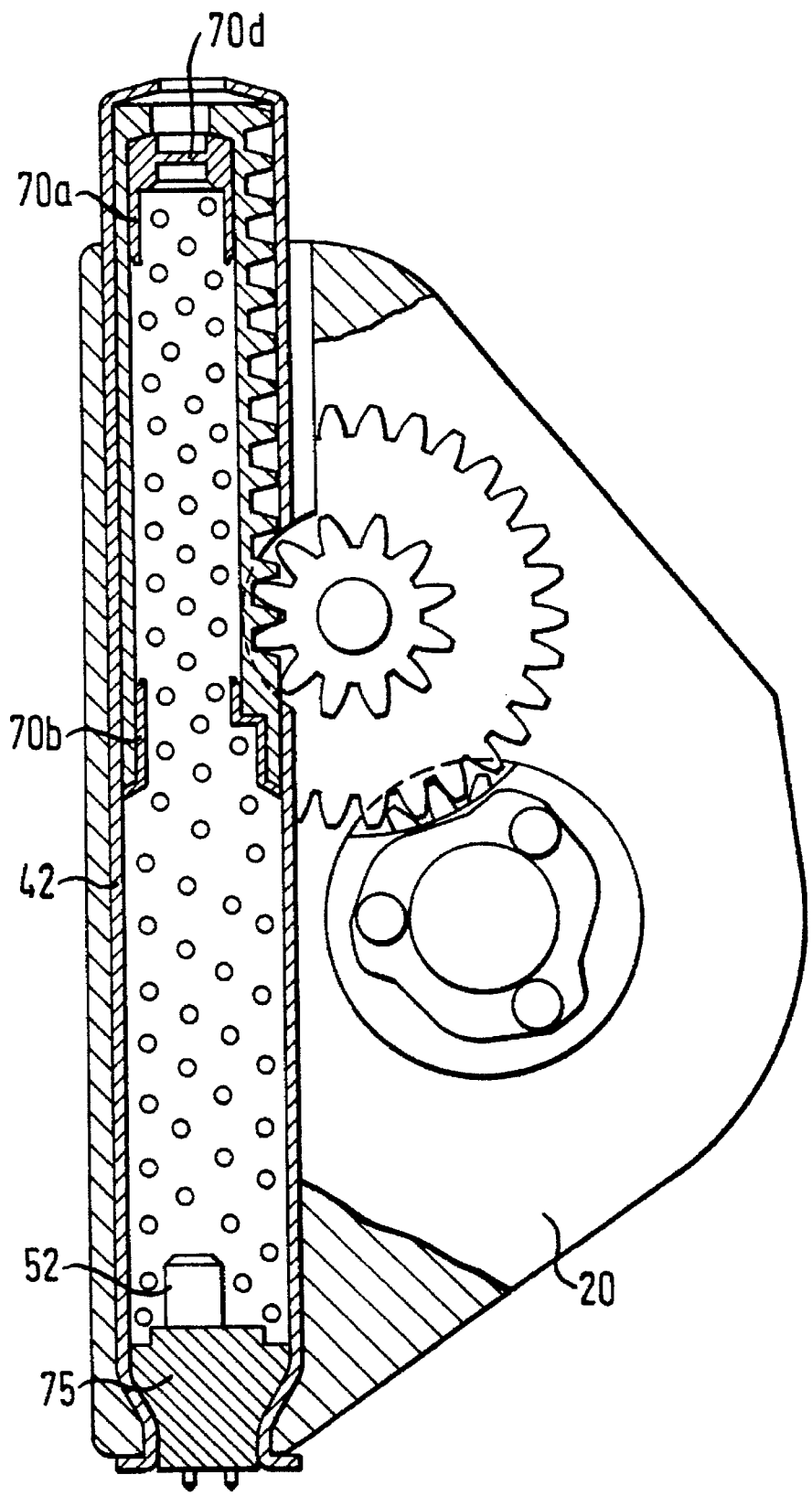

In the embodiment illustrated in FIGS. 6a and 6b a propelling charge in the form of a cartridge 70 is inserted into the hollow piston 44, provided with an abutment stop, the cartridge 70 also including the igniter 52. The cartridge 70 comprises a sleeve composed of two sleeve sections 70a, 70b joined at a peripheral groove 72, this groove defining a breaking line where the sleeve sections are separated under pressure load when the propelling charge within the cartridge 70 is activated. A sealing lip 74 is formed on one end of the sleeve section 70b adjacent plug 75, the sealing lip 74 making a sealing contact with the wall of cylinder tube 42. On its end opposite from igniter 52 the sleeve section 70a is provided with a bottom which, just as plug 55 of the embodiment described above, has an axial passage 70c and a diaphragm 70d.

Upon activation of cartridge 70, sleeve sections 70a, 70b are ruptured at groove 72 and sleeve section 70a is pushed upwardly within the piston 44 until it tightly closes the opening formed on the upper end of the piston (FIG. 6). Sleeve section 70b remains at the lower end of piston 44 and performs a sealing function with its sealing lip 74 remaining in contact with the wall of cylinder tube 42. Igniter 52 is urged against the plug 75 so that the latter seals off the tapered end of cylinder tube 42. This embodiment is practically free from any loss of pressure and, yet, is burstproof due to the presence of diaphragm 70d, which is ruptured under excessive pressure load.

What is claimed is:

1. A combined seat belt retractor and tensioner unit comprising:

a frame;

a belt reel rotatably supported in said frame;

a piston/cylinder linear drive with a pyrotechnical propelling charge, said linear drive comprising a hollow piston which has an envelope with a toothed rack;

a step-up gear having a pinion meshing with said rack and a gear wheel for driving said belt reel; and a housing joined to said frame and accommodating said step-up gear;

said propelling charge being accommodated within said hollow piston, said linear drive comprising a cylinder tube receiving said piston, and said housing being formed with a bore receiving said cylinder tube, said cylinder tube having a wall portion having a cutout, said pinion partly projecting through said cutout inside of said cylinder tube.

2. The unit of claim 1, wherein said linear drive with said cylinder tube, piston and propelling charge forms a preassembled unit.

3. The unit of claim 1, wherein said gear wheel is fixed to a coupling ring extending around an axial coupling extension of said belt reel, a plurality of clamping rollers being inserted between said coupling extension and said coupling ring.

4. The unit of claim 1, wherein said cylinder tube has a first axial end and a second axial end, said second axial end having a tapered portion which extends through said bore when said cylinder tube is received within said bore, said tapered portion having a flanged end portion which extends radially away from said bore, said flanged end portion engaging said housing which blocks axial movement of said cylinder tube within said bore in said housing.

5. A preassembled piston/cylinder linear drive unit for a seat belt tensioner, comprising a cylinder tube, a hollow piston accommodated in said cylinder tube, a pyrotechnical propellant charge with an igniter accommodated within said hollow piston, a tooth rack formed in an axially extending envelope portion of said piston, and a wall portion of said cylinder tube lying opposite said tooth rack being provided with a cutout.

6. A combined seat belt retractor and tensioner unit comprising:

a frame;

a belt reel rotatably supported in said frame;

a piston/cylinder linear drive with a pyrotechnical propelling charge, said linear drive comprising a hollow piston which has an envelope with a toothed rack;

a step-up gear having a pinion meshing with said rack and a gear wheel for driving said belt reel; and a housing joined to said frame and accommodating said step-up gear, said linear drive comprising a cylinder tube receiving said piston, said propelling charge being received within said hollow piston, said cylinder tube having a first axial end forming a burstproof stop for said piston and a second axial end provided with an inserted plug, said plug having an axial passage closed by a diaphragm.

7. The unit of claim 6, wherein said gearwheel is fixed to a coupling ring extending around an axial coupling extension of said belt reel, a plurality of clamping rollers being inserted between said coupling extension and said coupling ring.

8. A combined seat belt retractor and tensioner unit comprising:

a frame;

a belt reel rotatably supported in said frame;

a piston/cylinder linear drive with a pyrotechnical propelling charge, said linear drive comprising a hollow piston which has an envelope with a toothed rack;

a step-up gear having a pinion meshing with said rack and a gear wheel for driving said belt reel; and a housing joined to said frame and accommodating said step-up gear;

said propelling charge being received within said hollow piston, said propelling charge comprising a cartridge and an igniter within said cartridge, said cartridge comprising a sleeve seated within said hollow piston and formed of first and second sleeve sections joined at a peripheral groove, said first sleeve section having a bottom with an axial passage formed therein and a diaphragm closing said passage, and said second sleeve section having a peripheral sealing lip making a sealing contact with a surrounding wall portion of said cylinder tube.

9. The unit of claim 8, wherein said gear wheel is fixed to a coupling ring extending around an axial coupling extension of said belt reel, a plurality of clamping rollers being inserted between said coupling extension and said coupling ring.

10. A combined seat belt retractor and tensioner unit comprising:

a frame;

a belt reel rotatably supported in said frame;

a piston/cylinder linear drive with a pyrotechnical propelling charge, said linear drive comprising a hollow piston which has an envelope with a toothed rack;

a step-up gear having a pinion meshing with said rack and a gear wheel for driving said belt reel; and a housing joined to said frame and accommodating said step-up gear;

said propelling charge being accommodated within said hollow piston, said linear drive comprising a cylinder tube receiving said piston, and said housing being formed with a bore receiving said cylinder tube, said cylinder tube having a cutout and said pinion partly projecting through said cutout inside of said cylinder tube, and said igniter being an impact igniter with an impact pin projecting out of an opening in an axial end of said piston.

11. The unit of claim 10, wherein said gear wheel is fixed to a coupling ring extending around an axial coupling extension of said belt reel, a plurality of clamping rollers being inserted between said coupling extension and said coupling ring.

* * * * *